7682X
B. Hinkley,
Thrashing Mach.
Patented July 23. 1833.
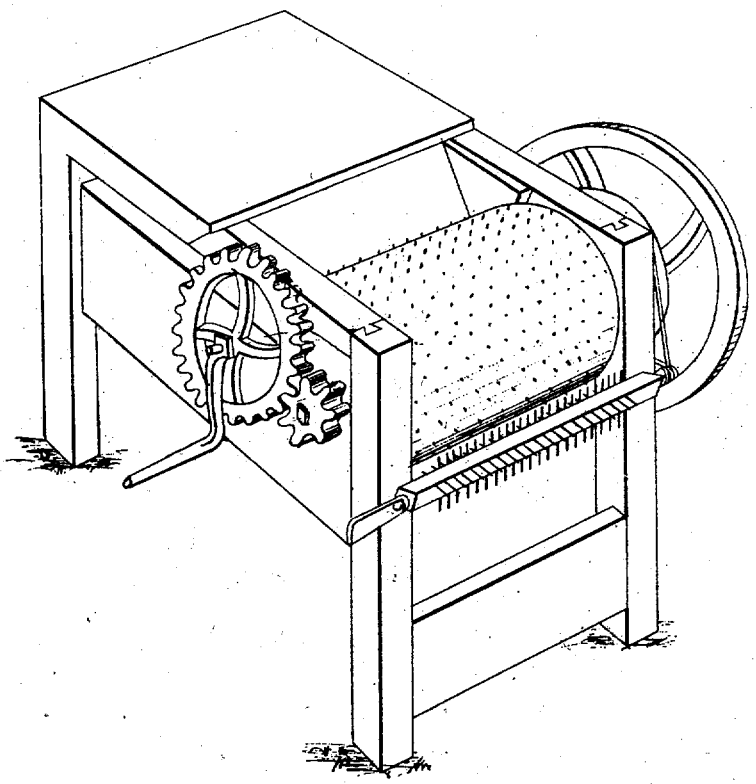

7/23/1833 1682X

July 23 1833 [illegible]

Benjamin Hinkley
Letters Patent.

The Schedule referred to in these Letters Patent & making part of the same
containing a description in the words of the said Benjamin Hinkley
himself of his improvement in the Threshing Machine.

This machine is intended to be operated by hand or horse power, and
the size and dimensions will vary according to its being operated in the
two ways. The dimensions suitable for hand power are posts three feet high,
three inches square, rails for ends are 18 inches long one foot wide & two
inches thick. The side rails are three feet long, one foot wide and two
inches thick. The front end rail is dropped to within three inches of
the bottom of the posts. The back end rail is raised to within three inches
of the top. The side rails and the frame is put together with screws or
bolts, and in putting the frame together the side rails must be framed
in even with the inside of the posts. These rails are represented on the
drawing referred to in this description and making a part of the same, are
marked C.C. The posts are marked g.g.g. Fig A of the drawing
represents the large cylinder filled with rows of teeth or wire projecting
about a fourth of an inch, [and may be one eighth of an inch] in diameter. The teeth in the rows are within
half an inch of each other. Fig C. of the drawing represents a spur
wheel four inches in diameter on one end of the cylinder, on the opposite
end of the cylinder is a speed wheel grooved for a round band of diameter
fifteen inches, and on the same end is a balance wheel to regulate the motion
three feet in diameter. Fig B represents the balance wheel and Fig. C.
the speed wheel. Under the cylinder and fitted to work with it is a sheet
iron grater apron. First I place a bed of three pieces of wood one inch apart
four inches wide laying upon wooden springs. The grater is of thick sheet
iron punched full of small holes and attached to the wooden bed pieces
by riveting the upper edges to the upper parts of the bed pieces. At the upper
edge of the bed pieces is a piece of sheet iron with fine teeth filed in, project-
ing the length of the teeth. Fig [illegible] represents a large cog wheel which
[illegible] the [illegible], which works into the spur wheel C. An iron shaft

1682X passes from the [illegible] thro the smaller cylinder two inches in diameter &
the length of the larger cylinder. and at the end of this shaft is attached
the crank &c. as represented by the drawing. Fig D represents the comb or
cleanser, which is made of a piece of wood two inches square, two feet long,
in this are placed teeth or wires drawn thro the corners & projecting about
one inch. a small iron gudgeon in each end. on one end end of it is
a small wheel two inches in diameter, which receives the band crossed from
the speed wheel. The comb is placed by two arms, Fig d as near the the larger cyl-
inder as can be without cutting. Fig ff. represents two studs let into
the tops of the posts. Fig E is a flooring on which to lay the grain.
Fig H is an apron pitching in an angle of about forty five degrees and
receives the grain which is carried in by the teeth,
What I claim as new and of my own invention is the grater apron resting
on springs and applied to the cylinder in the manner described. The form
and disposition of the teeth in the cylinder. the comb or cleanser to throw
off the straw Exd. Witnesses — Benjamin Hinkley.
W.C. John Otis
John P. Hagg (Do in portfolio)

658 words